(12) United States Patent
Gilad et al.

(10) Patent No.: US 8,180,367 B2
(45) Date of Patent: May 15, 2012

(54) CLUSTER-BASED FINGERPRINTING ALGORITHMS

(75) Inventors: Kutiel Gilad, Zichron Yakov (IL); Leonid Antsfeld, Nesher (IL)

(73) Assignee: Intel Corporation, Santa Clara, CA (US)

( * ) Notice: Subject to any disclaimer, the term of this patent is extended or adjusted under 35 U.S.C. 154(b) by 1042 days.

(21) Appl. No.: 12/059,964

(22) Filed: Mar. 31, 2008

(65) Prior Publication Data

US 2009/0247185 A1     Oct. 1, 2009

(51) Int. Cl.
*H04W 24/00*     (2009.01)
(52) U.S. Cl. ...................... 455/456.1; 370/331
(58) Field of Classification Search .......... None
See application file for complete search history.

(56) References Cited

U.S. PATENT DOCUMENTS

| 6,393,294 | B1 * | 5/2002 | Perez-Breva et al. | 455/456.5 |
| 2005/0208952 | A1 * | 9/2005 | Dietrich et al. | 455/456.1 |
| 2007/0081496 | A1 * | 4/2007 | Karge et al. | 370/331 |
| 2007/0133487 | A1 * | 6/2007 | Wang et al. | 370/338 |
| 2007/0149216 | A1 * | 6/2007 | Misikangas | 455/456.1 |

* cited by examiner

*Primary Examiner* — Rafael Pérez-Gutiérrez
*Assistant Examiner* — Daniel Nobile
(74) *Attorney, Agent, or Firm* — Caven & Aghevli LLC

(57) ABSTRACT

Methods and apparatus to provide cluster-based fingerprinting algorithms are described. In one embodiment, m closest fingerprints from k fingerprints are determined. The k fingerprints may be determined as closest fingerprints to a scan s in a signal strength domain, where the scan s is of an environment surrounding a wireless device. The center of mass of the m fingerprints may be used to determine a location estimation for the wireless device. Other embodiments are also described.

17 Claims, 4 Drawing Sheets

CLUSTER-BASED FINGERPRINTING ALGORITHMS

FIELD

The present disclosure generally relates to the field of electronics. More particularly, an embodiment of the invention generally relates to a cluster-based fingerprint algorithm.

BACKGROUND

Location aware services are quickly becoming of interest, especially in indoor areas. In order to provide accurate, just in time location aware services, obtaining a user's exact location is important.

Currently, one of the most accurate algorithms for obtaining indoor location information is location fingerprinting. Location fingerprinting generally involves the client measuring the amount of power it receives from an Access Point (AP) and using this information to discover the client's own location coordinates. However, in some situations, fingerprints may be close in the signal strength domain and quite far apart in the real world. This phenomenon consequently may explain poor results that were initially received in location estimation accuracy.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

In some embodiments, clustering techniques may be applied in a fingerprinting algorithm, e.g., to improve positioning accuracy estimation. Generally, the estimation process used for fingerprinting is carried out in two stages: (i) offline stage (also referred to as calibration stage) and (ii) online stage (also referred to as positioning stage).

In the Offline stage, the entire area of interest may be virtually covered by a rectangular grid of points. At each point on this grid, the received signal strengths (RSS) of all APs, which are detected, are measured. The vector of RSS values at each point on the grid is called the location fingerprint of that point. For each point, its coordinate and the corresponding fingerprint is stored (e.g., in a database or other file structure). The stored information may be referred to as a radio map of that area. In an embodiment, a three (3) meter grid spacing may yield about five (5) meters accuracy in the final location estimation. In the online stage, a wireless device may attempt to estimate its location by performing a scan of its environment. In one embodiment, the position may be determined by picking k fingerprints with the smallest signal distance to the observed scan and take the average of the x-y coordinates that corresponds to those k fingerprints. The metrics used for measuring distance between fingerprint in the radio map and the observed scan may be a Euclidian distance in the signal space domain. In some embodiments, k of approximately 4 may be utilized. Further details of embodiments of an online stage that utilizes a clustered approach (e.g., in Euclidian space) is discussed herein, for example, with reference to FIG. 3.

Figure 1:
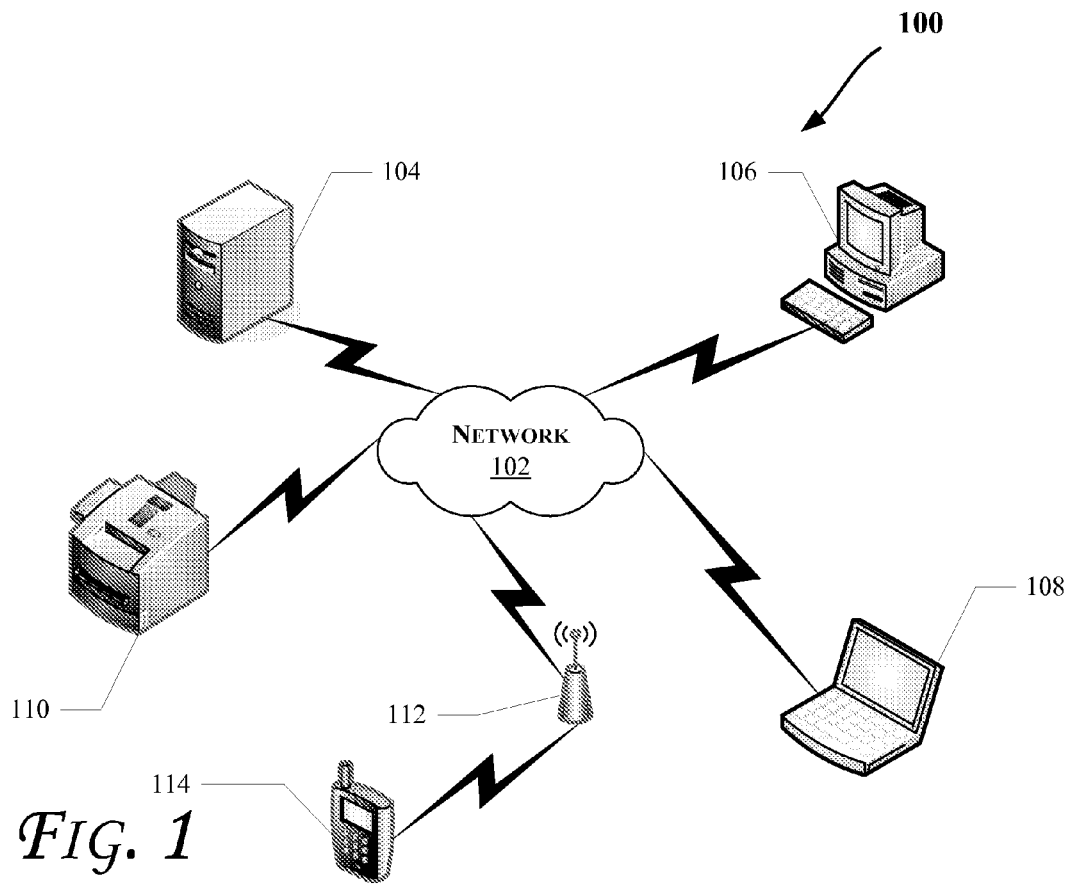
FIGS. 1, 2, and 5 illustrate various components of embodiments of communication systems, which may be utilized to implement one or more embodiments.

Some of the embodiments discussed herein may be implemented in various computing environments such as those discussed with reference to FIGS. 1-2 and 4. More particularly, FIG. 1 illustrates various components of an embodiment of a communication system 100, which may be utilized to implement some embodiments discussed herein. The system 100 may include a network 102 to enable communication between various devices such as a server computer 104, a desktop computer 106 (e.g., a workstation or a desktop computer), a laptop (or notebook) computer 108, a reproduction device 110 (e.g., a network printer, copier, facsimile, scanner, all-in-one device, etc.), a wireless access point 112, a personal digital assistant or smart phone 114, a rack-mounted computing system (not shown), etc. The network 102 may be any type of type of a computer network including an intranet, the Internet, and/or combinations thereof.

The devices 104-114 may communicate with the network 102 through wired and/or wireless connections. Hence, the network 102 may be a wired and/or wireless network. For example, as illustrated in FIG. 1, the wireless access point 112 may be coupled to the network 102 to enable other wireless-capable devices (such as the device 114) to communicate with the network 102. In some embodiments, more than one access point 112 may be in communication with the network 102. In one embodiment, the wireless access point 112 may include traffic management capabilities. Also, data communicated between the devices 104-114 may be encrypted (or cryptographically secured), e.g., to limit unauthorized access. The network 102 may utilize any communication protocol such as Ethernet, Fast Ethernet, Gigabit Ethernet, wide-area network (WAN), fiber distributed data interface (FDDI), Token Ring, leased line, analog modem, digital subscriber line (DSL and its varieties such as high bit-rate DSL (HDSL), integrated services digital network DSL (IDSL), etc.), asynchronous transfer mode (ATM), cable modem, and/or FireWire.

Wireless communication through the network 102 may be in accordance with one or more of the following: wireless fidelity (WiFi), wireless local area network (WLAN), wireless wide area network (WWAN), code division multiple access (CDMA) cellular radiotelephone communication systems, global system for mobile communications (GSM) cellular radiotelephone systems, North American Digital Cellular (NADC) cellular radiotelephone systems, time division multiple access (TDMA) systems, extended TDMA (E-TDMA) cellular radiotelephone systems, third generation partnership project (3G) systems such as wide-band CDMA (WCDMA), etc. Moreover, network communication may be established by internal network interface devices (e.g., present within the same physical enclosure as a computing system) such as a network interface card (NIC) or external network interface devices (e.g., having a separate physical enclosure and/or power supply than the computing system to which it is coupled).

Figure 2:
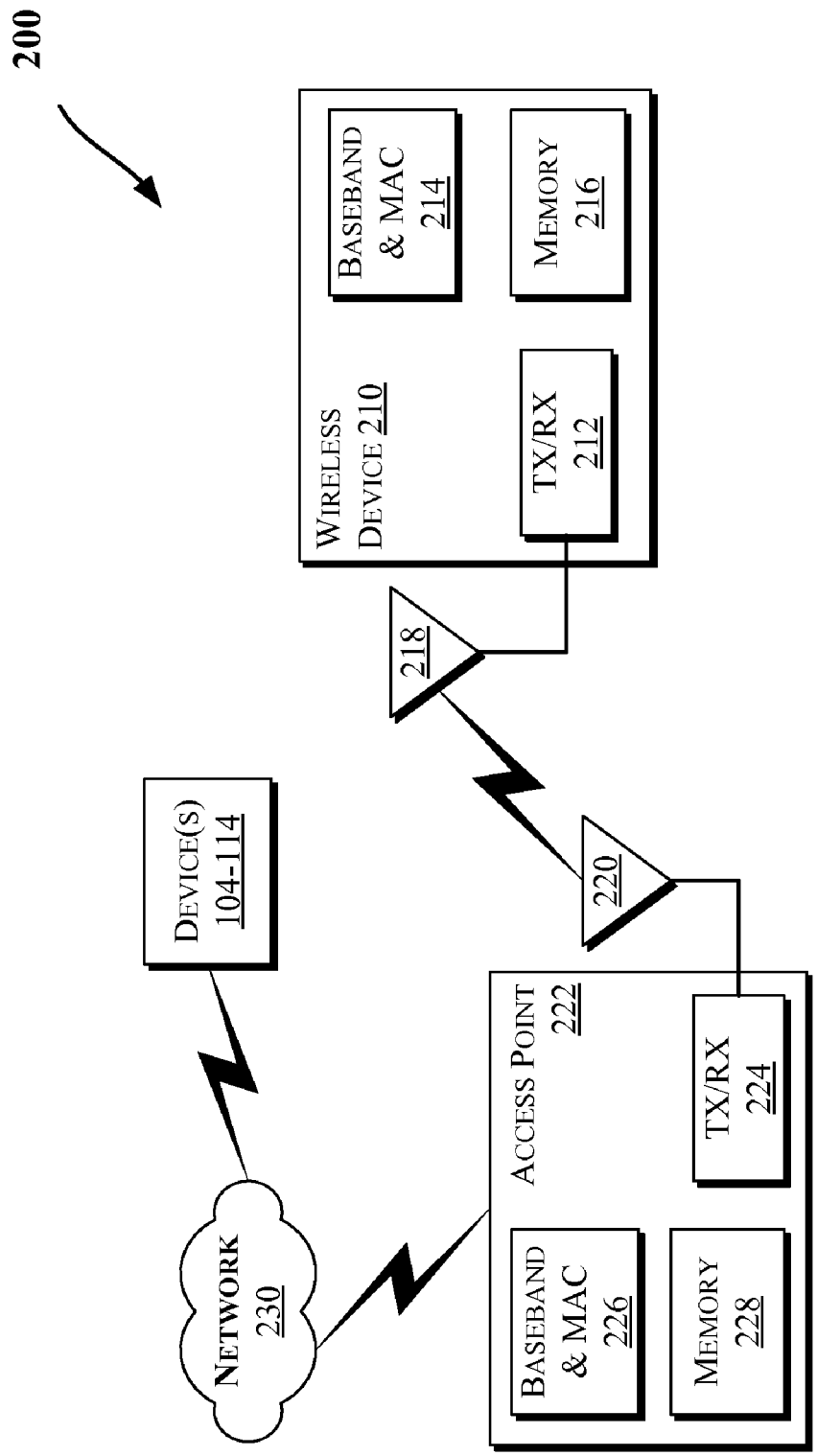

Referring to FIG. 2, a block diagram of a wireless local area or cellular network communication system 200 in accordance with one or more embodiments of the invention will be discussed. In the communication system 200 shown in FIG. 2, a wireless device 210 may include a wireless transceiver 212 to couple to an antenna 218 and to a logic 214 such as a processor (e.g., to provide baseband and media access control (MAC) processing functions). In some embodiment, one or more of the devices 104, 106, 108, 110, or 114 of FIG. 1 may include one or more of the components discussed with reference to the wireless device 210. Hence, in an embodiment, the devices 104, 106, 108, 110, or 114 of FIG. 1 may be the same or similar to the wireless device 210. In one embodiment of the invention, wireless device 210 may be a cellular telephone or an information handling system such as a mobile personal computer or a personal digital assistant or the like that incorporates a cellular telephone communication module. Logic 214 in one embodiment may comprise a single processor, or alternatively may comprise a baseband processor and an applications processor. Logic 214 may couple to a memory 216 which may include volatile memory such as dynamic random-access memory (DRAM), non-volatile memory such as flash memory, or alternatively may include other types of storage such as a hard disk drive. Some portion or all of memory 216 may be included on the same integrated circuit as logic 214, or alternatively some portion or all of memory 216 may be disposed on an integrated circuit or other medium, for example a hard disk drive, that is external to the integrated circuit of logic 214.

Wireless device 210 may communicate with access point 222 via a wireless communication link, where access point 222 may include one or more of: an antenna 220, a transceiver 224, a processor 226, and a memory 228. In some embodiments, the device 210 may directly communicate with other devices capable of wireless communication (e.g., having the same or similar components as discussed with reference to device 210), instead or in addition to communication via the access point 222. In one embodiment, access point 222 may be a base station of a cellular telephone network, and in an embodiment, access point 222 may be a an access point or wireless router of a wireless local or personal area network. In some embodiment, the access point 112 of FIG. 1 may include one or more of the components discussed with reference to the access point 222. Hence, in an embodiment, the access point 112 of FIG. 1 may be the same or similar to the access point 222. In an embodiment, access point 222 (and optionally wireless device 210) may include two or more antennas, for example to provide a spatial division multiple access (SDMA) system or a multiple input, multiple output (MIMO) system. Access point 222 may couple with network 230 (which may be the same or similar to the network 102 of FIG. 1 in some embodiments), so that wireless device 210 may communicate with network 230, including devices coupled to network 230 (e.g., one or more of the devices 104-114), by communicating with access point 222 via a wireless communication link. Network 230 may include a public network such as a telephone network or the Internet, or alternatively network 230 may include a private network such as an intranet, or a combination of a public and a private network. Communication between wireless device 210 and access point 222 may be implemented via a wireless local area network (WLAN). In one embodiment, communication between wireless device 210 and access point 222 may be at least partially implemented via a cellular communication network compliant with a Third Generation Partnership Project (3GPP or 3G) standard. In some embodiments, antenna 218 may be utilized in a wireless sensor network or a mesh network.

Figure 3:
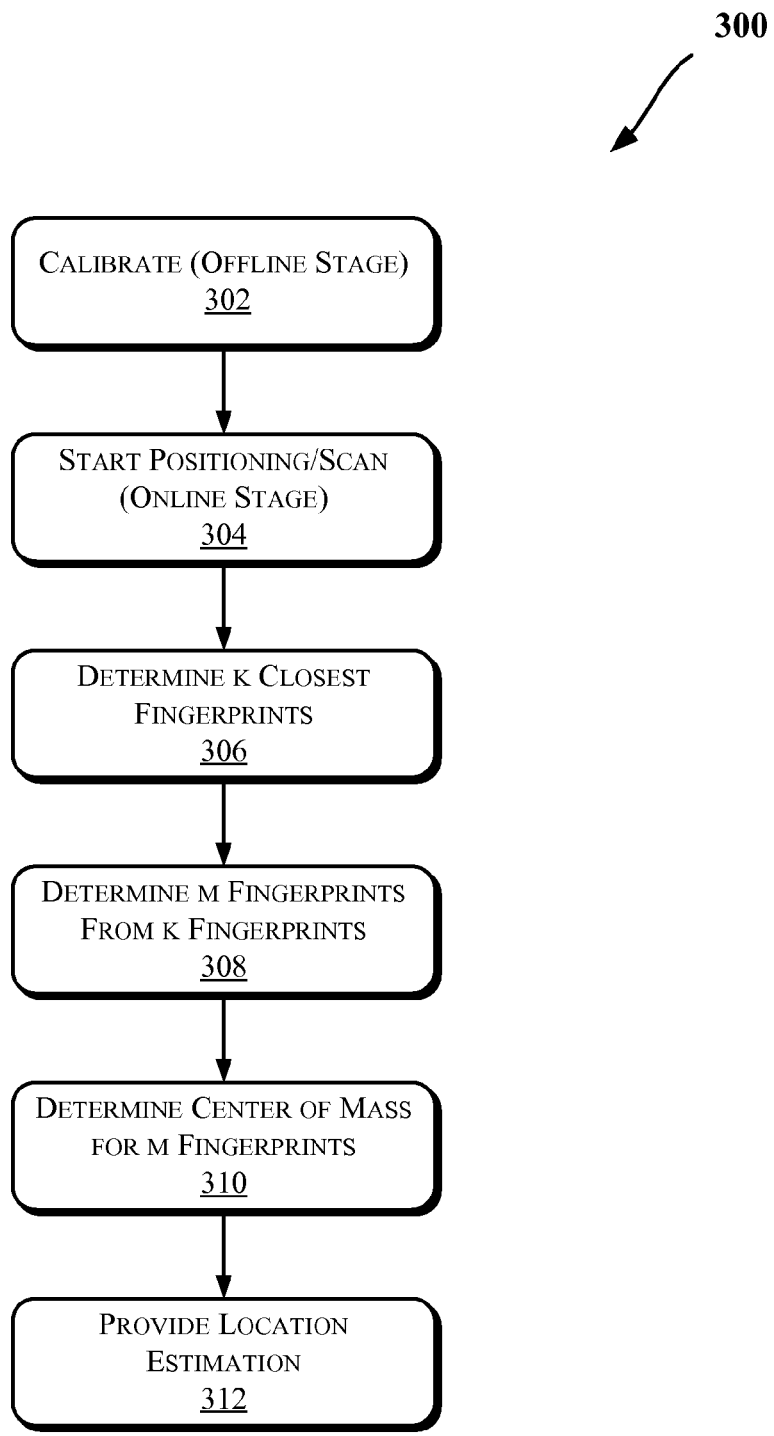
FIG. 3 illustrates a flow diagram of a method, according to an embodiment of the invention.

FIG. 3 illustrates a block diagram of an embodiment of a method 300 to estimate a location of a wireless device. In an embodiment, the method 300 may be used to estimate location of wireless device such as those discussed with reference to FIGS. 1-2. In an embodiment, various components discussed with reference to FIGS. 1-2 and 4 may be utilized to perform one or more of the operations discussed with reference to FIG. 3.

Referring to FIGS. 1-3, at an operation 302, calibration may be performed (also referred to as offline stage). In the Offline stage 302, the entire area of interest (e.g., a floor in a building or neighborhood in a city) may be virtually covered by a rectangular grid of points. At each point on this grid, the received signal strengths (RSS) of all APs which are detected, are measured. The vector of RSS values at each point on the grid is called the location fingerprint of that point. For each point, its coordinate and the corresponding fingerprint is stored (e.g., in a database or other file structure, in an embodiment, in the memory 216). The stored information may be referred to as a radio map of that area. In an embodiment, a three (3) meter grid spacing may yield about five (5) meters accuracy in the final location estimation.

At an operation 304, positioning may be started (also referred to as online stage). In the online stage, a wireless device (such as those discussed with reference to FIGS. 1-2) may attempt to estimate its location by performing a scan s of its environment (e.g., to determine existence and/or strength of signals transmitted by other wireless devices, such as APs) at operation 304. In an embodiment, clustering is performed during the online stage (e.g., by the logic 214). For example, at an operation 306, k closest fingerprints to s with the smallest distance in the signal space or signal strength domain may be determined. In an embodiment, operation 306 may obtain the k closest fingerprints to s in the signal strength domain from stored data (such as data stored during the offline stage at operation 302, e.g., data stored in memory 216).

At an operation 308, among those k fingerprints of operation 306, m (m<k) fingerprints that are best clustered in the Euclidian space may be determined (e.g., by the logic 214). In order to find m clustered fingerprints, an embodiment utilizes the following algorithm.

Let $(x_i, y_i)$ be a coordinate of fingerprints $f_i$, i=1, ... k. First, we denote $f_0$ with coordinates $(x_0, y_0)$ to be the center of mass of $\{f_i\}_{i=1}^{k}$, specifically, $$x_0 = \frac{1}{k}\sum_{i=1}^{k} x_i, \quad y_0 = \frac{1}{k}\sum_{i=1}^{k} y_i.$$

Next, we calculate the Euclidian distance $d_i = [(x_i - x_0)^2 + (y_i - y_0)]^{1/2}$ in the (x,y) space between each fingerprint $f_i$ and $f_0$. Finally, we choose m fingerprints with the smallest Euclidian distance $d_i$. In an embodiment, k of approximately 5 and m of approximately 4 may be used at operation 308.

At an operation 310, the center of mass of the obtained m fingerprints may be determined. At an operation 312, the result may be provided as client location estimation. In an embodiment, one or more of the operations discussed with reference to operations of FIG. 3 may be performed by the logic 214 of FIG. 2 and data discussed may be stored in the memory 216 or other memory accessible by the wireless device and its components.

In one embodiment, the position may be determined by picking k fingerprints with the smallest signal distance to the observed scan and take the average of the x-y coordinates that corresponds to those k fingerprints. The metrics used for measuring distance between fingerprint in the radio map and the observed scan is a Euclidian distance in the signal space domain. In some embodiments, k of approximately 4 may be utilized.

In some embodiments, techniques discussed herein may provide relatively more accurate client location in indoor environment, e.g., where Global Positioned System (GPS) signals may not be available. Improved accuracy of indoor location identification techniques enables enhancing existing location-based services and also enabling new types of services that require enhanced accuracy.

Figure 5:
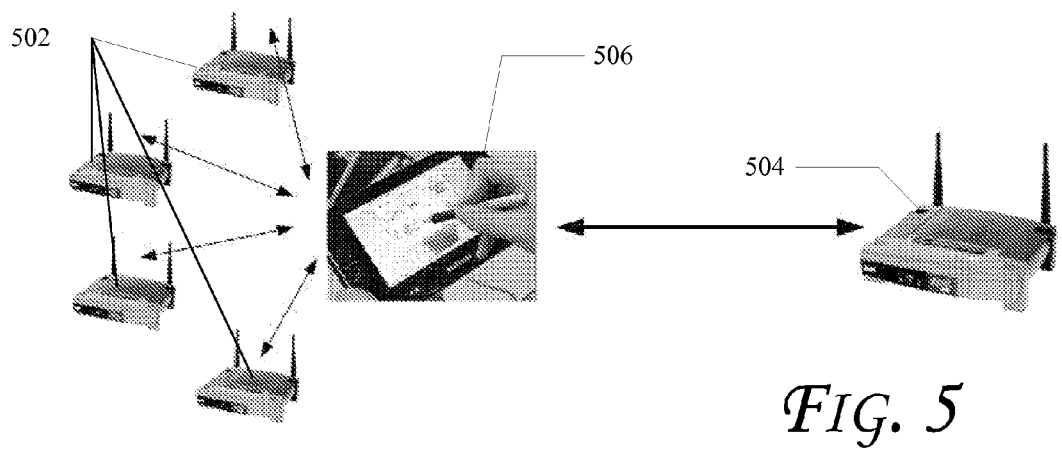

For example, while the current fingerprint algorithm filters may fingerprint only in a signal strength domain, some embodiments discussed herein may perform additional filtering in the real world domain. In an embodiment, multiple domains may be used to filter scattered fingerprints. For example, as shown in FIG. 5, in a controlled environment (e.g., deploying five APs, where 4 APs 502 are in close proximity (or clustered) with relatively low transmission power with a fifth AP 504 being relatively far away from the other four APs but with relatively larger transmission power and with a client wireless device 506 somewhere in the middle of this setup), the current fingerprint algorithm may produce a location estimation that is much closer to the strongest AP 504, while estimations in accordance with some embodiments discussed herein may produce an estimation which is closer to the four clustered APs 502 and hence more accurate.

Figure 4:
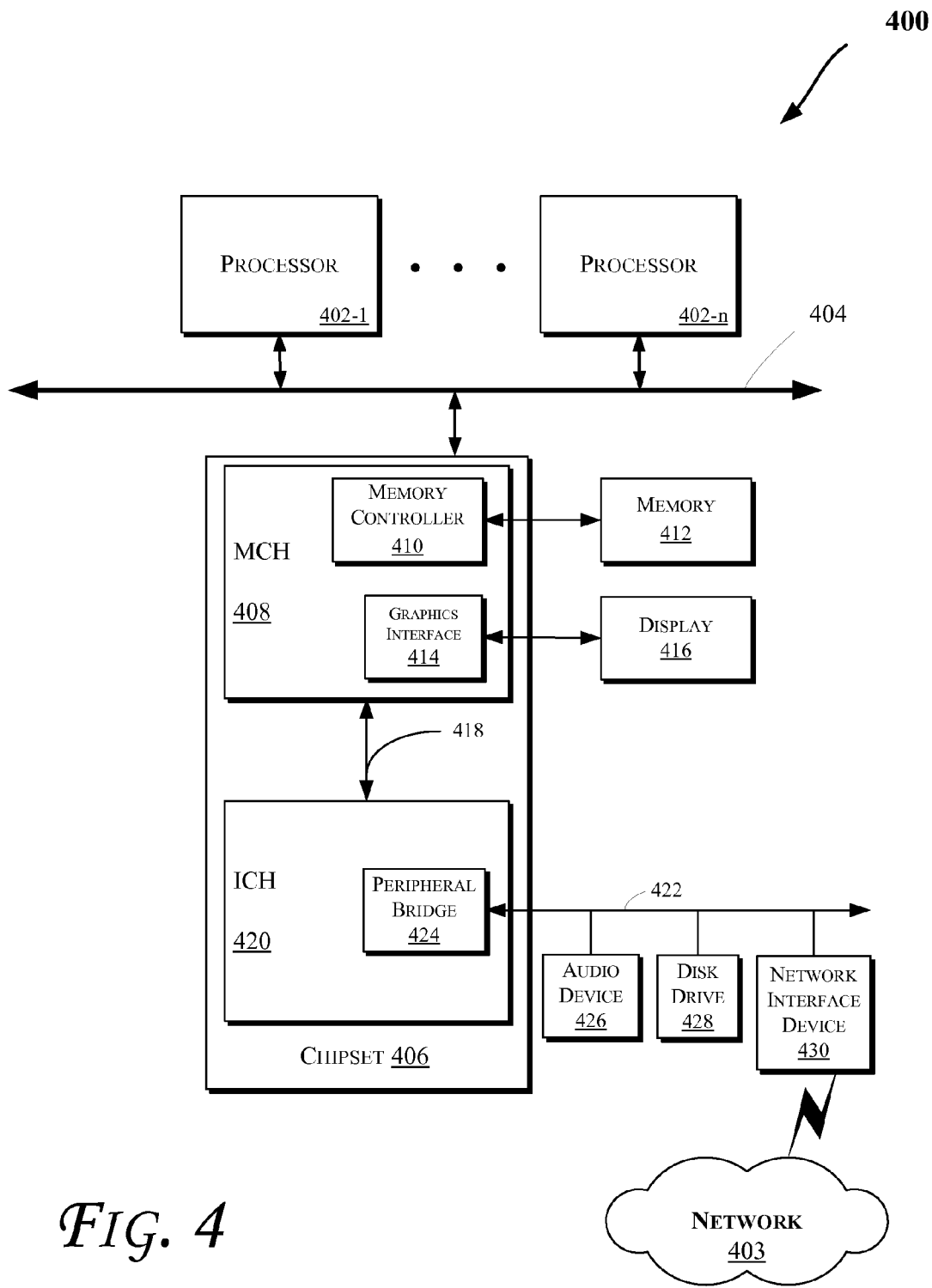
FIG. 4 illustrates a block diagram of an embodiment of a computing system, which may be utilized to implement various embodiments discussed herein.

Referring to FIG. 4, a block diagram of an embodiment of a computing system 400 is illustrated. One or more of the devices 104-114 of FIG. 1 and/or devices 210 or 222 of FIG. 2 may comprise one or more of the components of the computing system 400. The computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. Moreover, the operations discussed with reference to FIGS. 1-3 may be performed by one or more components of the system 400.

A chipset 406 may also communicate with the interconnection network 404. The chipset 406 may include a memory control hub (MCH) 408. The MCH 408 may include a memory controller 410 that communicates with a memory 412. The memory 412 may store data, including sequences of instructions that are executed by the CPU 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The MCH 408 may also include a graphics interface 414 that communicates with a display 416. In one embodiment of the invention, the graphics interface 414 may communicate with the display 416 via an accelerated graphics port (AGP). In an embodiment of the invention, the display 416 may be a flat panel display that communicates with the graphics interface 414 through, for example, a signal converter that translates a digital representation of an image stored in a storage device such as video memory or system memory into display signals that are interpreted and displayed by the display 416. The display signals produced by the interface 414 may pass through various control devices before being interpreted by and subsequently displayed on the display 416.

A hub interface 418 may allow the MCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430, which may be in communication with the computer network 403. In an embodiment, the device 430 may be a NIC capable of wireless communication. In an embodiment, the network 403 may be the same or similar to the networks 102 of FIG. 1 and/or 230 of FIG. 2. In one embodiment, the network interface device 430 may include one or more components of the wireless device 210 of FIG. 2. Also, the device 430 may be the same or similar to the device 210 of FIG. 2 in some embodiments. Other devices may communicate via the bus 422. Additionally, various components (such as the network interface device 430) may communicate with the MCH 408 in some embodiments of the invention. In addition, the processor 402 and the MCH 408 may be combined to form a single chip. Furthermore, the graphics interface 414 may be included within the MCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 400 may be arranged in a point-to-point (PtP) configuration. For example, processors, memory, and/or input/output devices may be interconnected by a number of point-to-point interfaces.

In various embodiments of the invention, the operations discussed herein, e.g., with reference to the figures, may be implemented as hardware (e.g., logic circuitry), software, firmware, or combinations thereof, which may be provided as a computer program product, e.g., including a machine-readable or computer-readable medium having stored thereon instructions (or software procedures) used to program a computer to perform a process discussed herein. The machine-readable medium may include a storage device such as those discussed herein. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method comprising:
scanning a surrounding environment of a wireless device for one or more access points to obtain a scan s;
determining k closest fingerprints to scan s in a signal strength domain;
determining m closest fingerprints based on the k fingerprints, wherein the m closest fingerprints are determined based on Euclidian distances between each pair of the k closest fingerprints; and
determining a center of mass of the m fingerprints, wherein the Euclidian distances are determined based on $d_i=[(x_i-x_0)^2+(y_i-y_0)^2]^{1/2}$ in the (x,y) space between each fingerprint $f_i$ and $f_0$ of fingerprints k comprising $f_i$, i=1, ..., k, wherein $f_0$ with coordinates $(x_0,y_0)$ is to be a center of mass of $\{f_i\}_{i=1}^{k}$, and wherein $$x_0 = \frac{1}{k}\sum_{i=1}^{k} x_i, \quad y_0 = \frac{1}{k}\sum_{i=1}^{k} y_i.$$

2. The method of claim 1, further comprising providing a location estimation of the wireless device based on the determined center of mass of the m fingerprints.

3. The method of claim 1, wherein determining the k closest fingerprints is performed by accessing stored data.

4. The method of claim 3, further comprising storing the data based on a scan performed during an offline stage.

5. The method of claim 1, wherein k is approximately five (5).

6. The method of claim 1, wherein m is approximately four (4).

7. The method of claim 1, wherein m is less than k.

8. A non-transitory computer-readable medium comprising one or more instructions that when executed on a processor configure the processor to:
scan a surrounding environment of a wireless device for one or more access points to obtain a scan s;
determine k closest fingerprints to scan s in a signal strength domain;
determine m closest fingerprints from the k fingerprints, wherein the m closest fingerprints are determined based on Euclidian distances between each pair of the k closest fingerprints; and
determine a center of mass of the m fingerprints, wherein the Euclidian distances are determined based on $d_i=[(x_i-x_0)^2+(y_i-y_0)^2]^{1/2}$ in the (x,y) space between each fingerprint $f_i$ and $f_0$ of fingerprints k comprising $f_i$, i=1, ..., k, wherein $f_0$ with coordinates $(x_0,y_0)$ is to be a center of mass of $\{f_i\}_{i=1}^{k}$, and wherein $$x_0 = \frac{1}{k}\sum_{i=1}^{k} x_i, \quad y_0 = \frac{1}{k}\sum_{i=1}^{k} y_i.$$

9. The non-transitory medium of claim 8, further comprising one or more instructions that when executed on the processor configure the processor to provide a location estimation of the wireless device based on the determined center of mass of the m fingerprints.

10. The non-transitory medium of claim 8, further comprising one or more instructions that when executed on the processor configure the processor to determine the k closest fingerprints by accessing stored data.

11. The non-transitory medium of claim 10, further comprising one or more instructions that when executed on the processor configure the processor to store the data based on a scan performed during an offline stage.

12. The non-transitory medium of claim 8, wherein k is approximately five (5).

13. The non-transitory medium of claim 8, wherein m is approximately four (4).

14. The non-transitory medium of claim 8, wherein m is less than k.

15. An apparatus comprising:
a processor to:
scan a surrounding environment of a wireless device for one or more access points to obtain a scan s;
determine k closest fingerprints to scan s in a signal strength domain;
determine m closest fingerprints based on the k fingerprints, wherein the m closest fingerprints are determined based on Euclidian distances between each pair of the k closest fingerprints k; and
determine a center of mass of the m fingerprints; and
a memory coupled to the processor to store data corresponding to the k closest fingerprints, wherein the Euclidian distances are determined based on $d_i=[(x_i-x_0)^2+(y_i-y_0)^2]^{1/2}$ in the (x,y) space between each fingerprint $f_i$ and $f_0$ of fingerprints k comprising $f_i$, i=1, ..., k, wherein $f_0$ with coordinates $(x_0,y_0)$ is to be a center of mass of $\{f_i\}_{i=1}^{k}$, and wherein $$x_0 = \frac{1}{k}\sum_{i=1}^{k} x_i, \quad y_0 = \frac{1}{k}\sum_{i=1}^{k} y_i.$$

16. The apparatus of claim 15, wherein the processor is to provide a location estimation of the wireless device based on the determined center of mass of the m fingerprints.

17. The apparatus of claim 15, wherein the processor is to comprise one or more processor cores.

* * * * *